US010540053B2

(12) United States Patent
Gasperi et al.

(10) Patent No.: US 10,540,053 B2
(45) **Date of Patent: *Jan. 21, 2020**

(54) METHODS AND SYSTEMS FOR MANAGING COMMUNITY INFORMATION

(71) Applicant: VELOCITY TECHNOLOGY SOLUTIONS, INC., New York, NY (US)

(72) Inventors: Aaron Michael Gasperi, Minneapolis, MN (US); Thomas Mac Kremer, Minneapolis, MN (US); Ronald Perry Wright, Boulder, CO (US); Joshua Ryan Tallen, Minneapolis, MN (US); John Robert Waite, Anamosa, IA (US); Doug Frey, Savage, MN (US); Paul Mockenhaupt, Savage, MN (US); Mark Rasmussen, Stillwater, MN (US)

(73) Assignee: Velocity Technology Solutions, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,333

(22) Filed: Aug. 21, 2017

(65) Prior Publication Data

US 2017/0344193 A1 Nov. 30, 2017

Related U.S. Application Data

(63) Continuation of application No. 14/477,493, filed on Sep. 4, 2014, now Pat. No. 9,740,363.

(Continued)

(51) Int. Cl.

*G06F 3/0481* (2013.01)
*G06F 11/34* (2006.01)

(Continued)

(52) U.S. Cl.

CPC ............ *G06F 3/0481* (2013.01); *G06F 11/34* (2013.01); *G06F 11/3419* (2013.01);

(Continued)

(58) Field of Classification Search

CPC ............................ G06F 11/34; G06F 11/3419

See application file for complete search history.

(56) References Cited

U.S. PATENT DOCUMENTS 5,045,994 A * 9/1991 Belfer ................ G06F 11/3664 703/25
5,859,963 A * 1/1999 O'Dowd .............. G06F 11/323 714/38.1

(Continued)

FOREIGN PATENT DOCUMENTS

| | | |
|---|---|---|
| CN | 103019520 A | 4/2013 |
| EP | 2 863 344 A1 | 4/2015 |
| WO | 2015/050797 A1 | 4/2015 |

OTHER PUBLICATIONS

Canadian Office Action dated Nov. 9, 2016 in Canadian Application No. 2,865,780, 3 pages.

(Continued)

*Primary Examiner* — Scott T Baderman
*Assistant Examiner* — Benjamin Smith
(74) *Attorney, Agent, or Firm* — Eric L. Sophir; Dentons US LLP

(57) ABSTRACT

The present disclosure describes a system and method for managing and disseminating community information in a cloud. The computer-implemented method and system for comparing service performance comprises receiving, by a server over a communication network from a computer of each of a plurality of client companies, metadata of a plurality of transactions in enterprise resource planning systems being operated by the plurality of client companies, and presenting, by the server over the communication net- (Continued)

work to a computer of a selected client company of the plurality of client companies, comparative performance information for display on a graphical user interface of the selected client company based on metadata of transactions in enterprise resource planning systems of other client companies that are substantially similar to the enterprise resource planning system of the selected client company.

13 Claims, 9 Drawing Sheets

Related U.S. Application Data

(60) Provisional application No. 61/885,884, filed on Oct. 2, 2013.

(51) Int. Cl.
*G06F 16/958* (2019.01)
*G06Q 10/06* (2012.01)

(52) U.S. Cl.
CPC ....... *G06F 16/972* (2019.01); *G06Q 10/0639* (2013.01); *G06Q 10/06393* (2013.01)

(56) References Cited

U.S. PATENT DOCUMENTS 7,493,622 B2* 2/2009 Borkan ............... G06F 11/3476 717/130
7,873,567 B2* 1/2011 Eder ...................... G06Q 40/00 705/35
7,933,926 B2* 4/2011 Ebert .................. G06F 11/3447 702/182
7,945,589 B1* 5/2011 Weiss ........................ G06F 8/71 707/795
8,087,007 B2* 12/2011 Duneau ............... G06F 11/3688 717/100
8,606,891 B2* 12/2013 Donaghey ........... G06F 16/1847 709/221
8,751,276 B2* 6/2014 Gillis ................... G06Q 10/063 705/7.12
8,799,769 B2* 8/2014 Liang .................. G06F 11/3495 715/234
8,856,748 B1* 10/2014 Larsen ................ G06F 11/3668 717/125
8,869,036 B1* 10/2014 Deshpande ......... G06F 11/3419 715/736
8,972,940 B2* 3/2015 Kannan ..................... G06F 8/77 717/124
8,978,014 B1* 3/2015 Larsen ................ G06F 11/3668 717/125
8,990,637 B1* 3/2015 Vlachogiannis ........ G06F 9/542 714/47.1
8,990,778 B1* 3/2015 Allocca ............... G06F 11/3692 717/126
9,038,027 B2* 5/2015 Kannan ..................... G06F 8/77 717/124
9,058,428 B1* 6/2015 Siddiqui ............. G06F 11/3688
9,268,663 B1* 2/2016 Siddiqui ............. G06F 11/3447
9,311,211 B2* 4/2016 Chatterjee ........... G06F 11/3409
9,454,353 B2* 9/2016 Boss ......................... G06F 8/61
9,740,363 B2* 8/2017 Gasperi ................. G06F 16/972
9,747,185 B2* 8/2017 Fine .................... G06F 11/3419
9,819,729 B2* 11/2017 Moon ..................... H04L 67/10
2002/0194329 A1* 12/2002 Ailing .................... G06Q 10/06 709/224
2003/0208481 A1* 11/2003 Neumann ........... G06F 16/2358
2005/0039186 A1* 2/2005 Borkan ............... G06F 11/3476 719/310
2005/0071266 A1* 3/2005 Eder ...................... G06Q 40/00 705/38
2005/0154557 A1* 7/2005 Ebert .................. G06F 11/3428 702/182
2005/0229161 A1* 10/2005 Wang ........................ G06F 8/38 717/125
2005/0246357 A1 11/2005 Geary et al.
2006/0259352 A1* 11/2006 Hileman ................ G06Q 10/04 705/7.38
2007/0083647 A1* 4/2007 Frost ................... G06F 11/3419 709/224
2007/0136024 A1* 6/2007 Moser ................. G06F 11/3688 702/119
2007/0245002 A1 10/2007 Nguyen et al.
2007/0261035 A1* 11/2007 Duneau ............... G06F 11/3688 717/135
2008/0148235 A1* 6/2008 Foresti ................ G06F 11/3604 717/123
2010/0242032 A1* 9/2010 Ladki ........................ G06F 8/71 717/171
2011/0004620 A1* 1/2011 Butler .................... G06Q 10/06 707/769
2011/0029957 A1* 2/2011 Shufer ................ G06F 11/3688 717/127
2011/0041121 A1* 2/2011 Schalk .................... G06F 8/316 717/127
2012/0022911 A1* 1/2012 Gillis ................... G06Q 10/063 705/7.26
2012/0036239 A1* 2/2012 Donaghey ........... G06F 16/1847 709/221
2012/0060142 A1* 3/2012 Fliess ........................ G06F 8/70 717/102
2012/0079456 A1* 3/2012 Kannan ..................... G06F 8/77 717/124
2012/0174071 A1* 7/2012 Kannan ..................... G06F 8/77 717/124
2012/0204094 A1* 8/2012 Liang .................. G06F 11/3495 715/234
2012/0222017 A1* 8/2012 Hinkle .................... G06F 11/30 717/130
2013/0030764 A1* 1/2013 Chatterjee ........... G06F 11/3409 702/182
2014/0297405 A1* 10/2014 Fine .................... G06F 11/3419 705/14.53
2014/0337713 A1* 11/2014 Liang .................. G06F 11/3495 715/234
2015/0074177 A1* 3/2015 Yamamoto .......... G06F 11/3419 709/203
2015/0095761 A1* 4/2015 Gasperi ............ G06Q 10/06393 715/234
2015/0095892 A1* 4/2015 Baggott .............. G06F 11/3612 717/127
2015/0095902 A1* 4/2015 Boss ......................... G06F 8/61 717/174
2015/0261585 A1* 9/2015 Vlachogiannis ........ G06F 9/542 719/318
2015/0278517 A1* 10/2015 Weaver ................... G06F 21/55 726/26
2015/0358391 A1* 12/2015 Moon ..................... H04L 67/10 709/224
2016/0103750 A1* 4/2016 Cooper ............... G06F 11/3495 719/328

OTHER PUBLICATIONS

European Communication dated Mar. 21, 2016 in European Application No. 14187521.1, 6 pages.
Extended European Search Report dated Mar. 25, 2015 corresponding to European Patent Application No. 14187521.1, 5 pages.
International Search Report and Written Opinion dated Dec. 30, 2014 corresponding to International Patent Application No. PCT/US2014/057944, 12 pages.
Japanese Office Action, with English Translation, dated Sep. 5, 2017 in corresponding Japanese Patent Application No. 2016-546745, 8 pages.

(56) References Cited

OTHER PUBLICATIONS

United States Notice of Allowance issued in U.S. Appl. No. 14/477,493, dated Jun. 28, 2017, Methods and Systems for Managing Community Information, Inventor: Aaron Michael Gasperi, 16 pages.
United States Final Office Action issued in U.S. Appl. No. 14/477,493, dated Jan. 26, 2017, Methods and Systems for Managing Community Information, Inventor: Aaron Michael Gasperi, 21 pages.
United States Non-Final Office Action issued in U.S. Appl. No. 14/477,493, dated Jun. 30, 2016, Methods and Systems for Managing Community Information, Inventor: Aaron Michael Gasperi, 17 pages.
Chinese Office Action (with English Translation) dated Nov. 2, 2018, issued in corresponding Chinese Application No. 201480066066.9, 22 pages.
Australian Examination Report, dated May 17, 2019, issued in corresponding Australian Patent Application No. 2014329810, 4 pages.
English Summary of Mexican Office Action , dated Jun. 2019, issued in corresponding Mexican Patent Application No. MX/a/2016/004190, 9 pages.
Chinese Office Action (with English translation), dated May 8, 2019, issued in corresponding Chinese Patent Application No. 2014800660669, 17 pages.
Australian Examination Report, dated Oct. 9, 2019, issued in corresponding Australian Application No. 2014329810, 3 pages.

* cited by examiner

Figure 4:
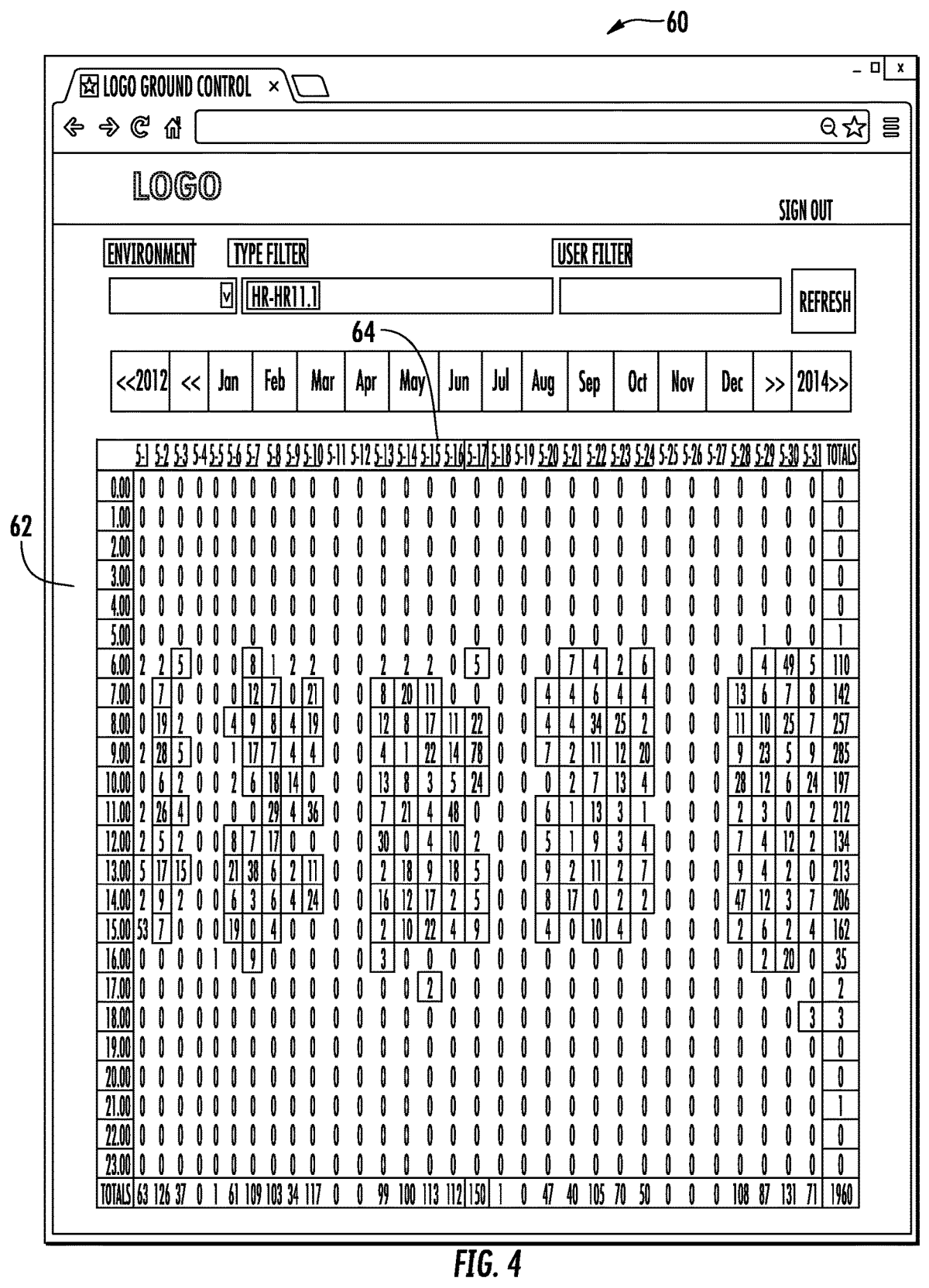

60

LOGO GROUND CONTROL

LOGO

SIGN OUT

ENVIRONMENT | TYPE FILTER | USER FILTER

HR-HR11.1

REFRESH

64

<<2012 | << | Jan | Feb | Mar | Apr | May | Jun | Jul | Aug | Sep | Oct | Nov | Dec | >> | 2014>>

62

| | 5-1 | 5-2 | 5-3 | 5-4 | 5-5 | 5-6 | 5-7 | 5-8 | 5-9 | 5-10 | 5-11 | 5-12 | 5-13 | 5-14 | 5-15 | 5-16 | 5-17 | 5-18 | 5-19 | 5-20 | 5-21 | 5-22 | 5-23 | 5-24 | 5-25 | 5-26 | 5-27 | 5-28 | 5-29 | 5-30 | 5-31 | TOTALS |
|---|---|---|---|---|---|---|---|---|---|---|---|---|---|---|---|---|---|---|---|---|---|---|---|---|---|---|---|---|---|---|---|---|
| 0.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 |
| 6.00 | 2 | 2 | 5 | 0 | 0 | 0 | 8 | 1 | 2 | 2 | 0 | 0 | 2 | 2 | 2 | 0 | 5 | 0 | 0 | 0 | 7 | 4 | 2 | 6 | 0 | 0 | 0 | 0 | 4 | 49 | 5 | 110 |
| 7.00 | 0 | 7 | 0 | 0 | 0 | 0 | 12 | 7 | 0 | 21 | 0 | 0 | 8 | 20 | 11 | 0 | 0 | 0 | 0 | 4 | 4 | 6 | 4 | 4 | 0 | 0 | 0 | 13 | 6 | 7 | 8 | 142 |
| 8.00 | 0 | 19 | 2 | 0 | 0 | 4 | 9 | 8 | 4 | 19 | 0 | 0 | 12 | 8 | 17 | 11 | 22 | 0 | 0 | 4 | 4 | 34 | 25 | 2 | 0 | 0 | 0 | 11 | 10 | 25 | 7 | 257 |
| 9.00 | 2 | 28 | 5 | 0 | 0 | 1 | 17 | 7 | 4 | 4 | 0 | 0 | 4 | 1 | 22 | 14 | 78 | 0 | 0 | 7 | 2 | 11 | 12 | 20 | 0 | 0 | 0 | 9 | 23 | 5 | 9 | 285 |
| 10.00 | 0 | 6 | 2 | 0 | 0 | 2 | 6 | 18 | 14 | 0 | 0 | 0 | 13 | 8 | 3 | 5 | 24 | 0 | 0 | 0 | 2 | 7 | 13 | 4 | 0 | 0 | 0 | 28 | 12 | 6 | 24 | 197 |
| 11.00 | 2 | 26 | 4 | 0 | 0 | 0 | 0 | 29 | 4 | 36 | 0 | 0 | 7 | 21 | 4 | 48 | 0 | 0 | 0 | 6 | 1 | 13 | 3 | 1 | 0 | 0 | 0 | 2 | 3 | 0 | 2 | 212 |
| 12.00 | 2 | 5 | 2 | 0 | 0 | 8 | 7 | 17 | 0 | 0 | 0 | 0 | 30 | 0 | 4 | 10 | 2 | 0 | 0 | 5 | 1 | 9 | 3 | 4 | 0 | 0 | 0 | 7 | 4 | 12 | 2 | 134 |
| 13.00 | 5 | 17 | 15 | 0 | 0 | 21 | 38 | 6 | 2 | 11 | 0 | 0 | 2 | 18 | 9 | 18 | 5 | 0 | 0 | 9 | 2 | 11 | 2 | 7 | 0 | 0 | 0 | 9 | 4 | 2 | 0 | 213 |
| 14.00 | 2 | 9 | 2 | 0 | 0 | 6 | 3 | 6 | 4 | 24 | 0 | 0 | 16 | 12 | 17 | 2 | 5 | 0 | 0 | 8 | 17 | 0 | 2 | 2 | 0 | 0 | 0 | 47 | 12 | 3 | 7 | 206 |
| 15.00 | 53 | 7 | 0 | 0 | 0 | 19 | 0 | 4 | 0 | 0 | 0 | 0 | 2 | 10 | 22 | 4 | 9 | 0 | 0 | 4 | 0 | 10 | 4 | 0 | 0 | 0 | 0 | 2 | 6 | 2 | 4 | 162 |
| 16.00 | 0 | 0 | 0 | 0 | 1 | 0 | 9 | 0 | 0 | 0 | 0 | 0 | 3 | 0 | 0 | 0 | 0 | 0 | 0 | 0 | 0 | 0 | 0 | 0 | 0 | 0 | 0 | 0 | 2 | 20 | 0 | 35 |
| 17.00 | 0 | 0 | 0 | 0 | 0 | 0 | 0 | 0 | 0 | 0 | 0 | 0 | 0 | 0 | 2 | 0 | 0 | 0 | 0 | 0 | 0 | 0 | 0 | 0 | 0 | 0 | 0 | 0 | 0 | 0 | 0 | 2 |
| 18.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 3 | 3 |
| 19.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| 22.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23.00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| TOTALS | 63 | 126 | 37 | 0 | 1 | 61 | 109 | 103 | 34 | 117 | 0 | 0 | 99 | 100 | 113 | 112 | 150 | 1 | 0 | 47 | 40 | 105 | 70 | 50 | 0 | 0 | 0 | 108 | 87 | 131 | 71 | 1960 |

LOGO GROUND CONTROL ×

LOGO

SIGN OUT

72

| NAME | FUNCTION | COUNT | Avg RESPONSE TIME | COMMUNITY SIZE | COMMUNITY RESPONSE TIME | COMMUNITY COUNT | MULTIPLE OF COMMUNITY |
|---|---|---|---|---|---|---|---|
| AP230 | C | 7 | 13.73 secs | 9.0.1.5.174 | .65 secs | | 21.22 |
| | | | | 9.0.1.7.181 | .71 secs | | 19.30 |
| | | | | 9.0.1.9.153 | .57 secs | | **24.29** |
| | | | | 9.0.1.11.231 | 1.20 secs | | 11.39 |
| AP270 | C | 10 | 11.34 secs | 9.0.1.5.174 | .55 secs | | 20.68 |
| | | | | 9.0.1.7.181 | .96 secs | | 11.75 |
| | | | | 9.0.1.9.153 | 1.37 secs | | **8.31** |
| | | | | 9.0.1.11.231 | 1.27 secs | | 8.92 |
| CB221 | C | 4 | 5.02 secs | 9.0.1.5.174 | .66 | | 7.63 |
| | | | | 9.0.1.7.181 | .81 | | 6.23 |
| | | | | 9.0.1.9.153 | .38 | | **13.27** |
| | | | | 9.0.1.11.231 | 9.21 secs | | .55 |
| GL291 | C | 48 | 4.03 secs | 9.0.1.5.174 | .24 | | 16.99 |
| | | | | 9.0.1.7.181 | .52 secs | | 7.78 |
| | | | | 9.0.1.7.181 | .68 secs | | **5.97** |
| | | | | 9.0.1.9.153 | 1.43 secs | | 2.82 |
| | | | | 9.0.1.11.231 | 1.43 secs | | 3.78 |
| CB220 | C | 51 | 3.11 secs | 9.0.1.5.174 | .76 secs | | 4.11 |
| | | | | 9.0.1.7.181 | .68 secs | | 4.58 |
| | | | | 9.0.1.9.153 | 1.08 secs | | **2.88** |

LOGO NAME

LOGO

SYSTEM AVAILABILITY

SEARCH: ROWS PER PAGE: 10 EXPORT OPTION: CSV PDF PRINT

PREVIOUS 1 NEXT

| START | END | DURATION IN MINUTES | SYSTEM | Prod | DETECTED BY | DESCRIPTION | ROOT CAUSE | DETAILS |
|---|---|---|---|---|---|---|---|---|
| 2014-04-23 16:28:00 | 2014-04-23 17:10:00 | 42 | INTERNAL IT | | CUSTOMER | CANNOT ACCESS LAWSON | n/a | DETAILS |
| 2014-04-24 16:30:00 | 2014-04-24 17:15:00 | 45 | LAWSON S3 | | CUSTOMER | LAWSON - DOWN | n/a | DETAILS |

SHOWING 1 TO 2 OF 2 ENTRIES

PREVIOUS 1 NEXT

FIG. 8

| PL NAME | PL VERSION | VERSION | ESP | MSP | SERVER | ORACLE VERSION | ORACLE INSTANCE | PRODUCTION | MONITORED |
|---|---|---|---|---|---|---|---|---|---|
| dev901 | 9.0.1 | 9.0.1 | SP7 | MSP#5 | | 11.2.0.2.0 | | | ✓ |
| LOGAN | 9.0.1 | 9.0.1 | SP7 | n/a | | 11.2.0.2.0 | | | ✓ |
| gen | n/a | 9.0.1 | SP7 | n/a | | 11.2.0.2.0 | | | ✓ |
| TEST901 | 9.0.1 | 9.0.1 | SP7 | MSP#5 | | 11.2.0.2.0 | | | ✓ |
| LOGAN | 9.0.1 | 9.0.1 | SP7 | n/a | | 11.2.0.2.0 | | ✓ | ✓ |
| gen | n/a | 9.0.1 | SP7 | n/a | | 11.2.0.2.0 | | ✓ | ✓ |
| prod901 | 9.0.1 | 9.0.1 | SP7 | MSP#5 | | 11.2.0.2.0 | | ✓ | ✓ |

METHODS AND SYSTEMS FOR MANAGING COMMUNITY INFORMATION

CROSS-REFERENCE TO RELATED APPLICATIONS

This application is a Continuation of U.S. patent application Ser. No. 14/477,493, filed on Sep. 4, 2014, and claims priority to U.S. Provisional Application Ser. No. 61/885,884, filed Oct. 2, 2013, entitled "Methods and Systems for Managing Community Information," which is incorporated by reference in its entirety.

FIELD OF THE INVENTION

This invention relates generally to managing and disseminating community information in a cloud.

BACKGROUND

Some companies run, manage, and service their own enterprise systems, such as those from Oracle® or Infor Lawson® systems. Other companies outsource the services to a third party, who will host the hardware and software, and will manage these enterprise systems for the companies. In either configuration, however, the companies are not able to benefit from the experiences of other companies to benchmark their use of the enterprise systems.

SUMMARY

The present disclosure describes a system and method for managing and disseminating community information in a cloud. In an exemplary method for utilizing the community information, a client company performs transactions and/or software operations (e.g., actions) in an enterprise system hosted by a host entity, such as in a cloud environment. The host entity stores metadata (e.g., response time, delay time, processing time, usage) about the transactions in a database for the client company's actions and the actions of other client companies. The host entity uses the stored metadata to present information to the client company regarding the performance of the client company in comparison to one or more other client companies having metadata stored in the database. The host entity may present a webpage to the client company that shows the client company's performance based on the particular metadata along with metadata for one or more other client company's using the same or similar applications or performing the same or similar transactions.

In one embodiment, a computer-implemented method comprises receiving, by a server over a communication network from a computer of each of a plurality of client companies, a first transmission comprising metadata of a plurality of software operations in enterprise resource planning systems being operated by the plurality of client companies, wherein each of the software operations is linked to a specific metadata permitting the server to group data relating to each software operation to a specific category; and presenting, by the server over the communication network to a computer of a selected client company of the plurality of client companies, a second transmission comprising comparative performance information regarding a plurality of the software operations for display of performance of the plurality of the software operations based on metadata of the software operations in enterprise resource planning systems of other client companies that are substantially similar to the enterprise resource planning system of the selected client company.

In another embodiment, a system comprises a communication server configured to receive a transmission comprising performance data of software operations performed by an enterprise resource planning system server of each client company and transmit comparative information to a client company communication server for display on a client company computer, wherein the comparative information represents performance data of software operations of substantially similar enterprise resource planning systems compared to performance data of software operations of the client company's enterprise resource planning system; and a dashboard server configured to compare performance data of software operations performed by an enterprise resource planning system server of each client company and present the compared performance data to the communication server for transmission to a client company.

In yet another embodiment, a computer-implemented method comprises receiving, by a server, a first transmission comprising a first set of metadata from a first client company for software operations in a first enterprise system, wherein each of the software operations is linked to a specific metadata permitting the server to group data relating to each software operation to a specific category; receiving, by the server, a second transmission comprising a second set of metadata from a second client company for software operations in a second enterprise system, wherein each of the software operations is linked to a specific metadata permitting the server to group data relating to each software operation to a specific category; storing, by the server, the first set of metadata and the second set of metadata in a database; comparing, by the server, the first set of metadata to the second set of metadata; and sending, by the server, a third transmission of the comparison of performance of the software operations for presentation on a display of a computing device of the first client company.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 shows a graphical user interface showing a heat map according to an exemplary embodiment.

FIG. 5 shows a graphical user interface for comparing community information according to an exemplary embodiment.

FIG. 8 shows a graphical user interface for displaying outages according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The systems and methods described herein are able to present information to the client company from the host entity based upon the community of client companies hosted by the host entity. The client company can use the presented information to compare its performance against similar client companies.

Figure 1:
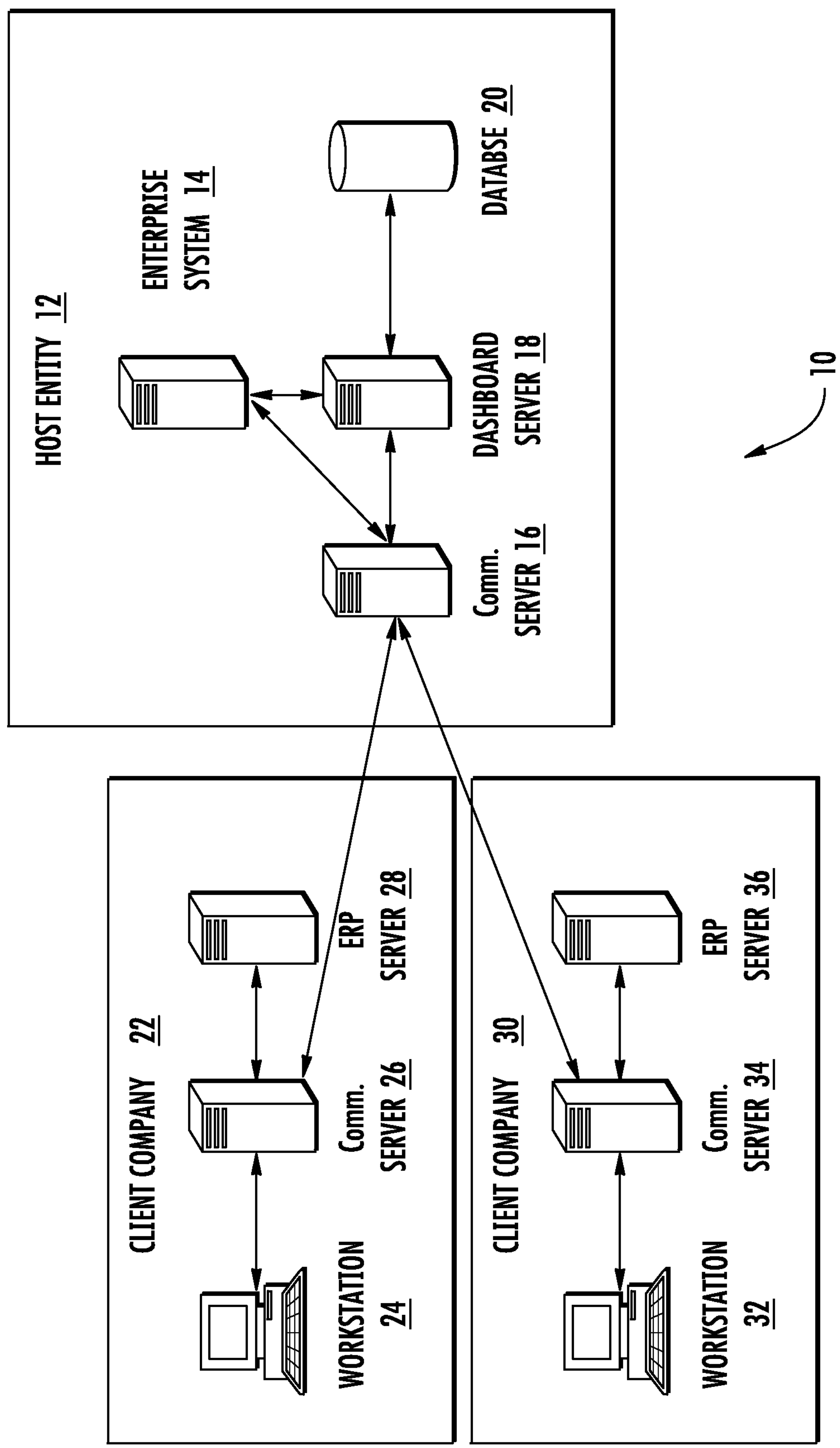
FIG. 1 shows a system architecture according to an exemplary embodiment.

Referring to FIG. 1, a system architecture 10 for managing and disseminating community information in a cloud is shown according to an exemplary embodiment. A host entity 12 can host an enterprise system 14 for various client companies, collectively referred to as a community. The host entity 12 can host the enterprise system 14 on a cloud platform. The host entity 12 may provide service level agreements (SLAs) that the client company 22, 30 cannot obtain themselves. The host entity 12 can provide real-time information on a dashboard regarding the operation of the enterprise system 14, including a number of tickets, response time, who is logging on, etc. The client company 22, 30 may use the enterprise system 14 to perform a plurality of transactions and/or software operations, where each transaction and/or software operation is performed by a client company 22, 30 representative using hardware and/or software hosted by the host entity 12. Each transaction and/or software operation (e.g., adding an invoice, submitting a time record, submitting a batch job) is not intended to be limited to a financial transaction and/or software operation, but rather a measurable or discrete task, project, and/or action in the enterprise system 14. Because the host entity 12 has so much data from different client companies 22, 30 using the same or similar enterprise systems, the host entity 12 can also provide information to the client company 22, 30 about the performance of the client company's enterprise system as compared to other client companies. For example, the host entity 12 may provide feedback to the client company that an accounts payable clerk processes an invoice for 2.1 seconds, but other client companies in the community may be performing the same task at a faster rate. In another example, a clerk may have a 75% success rate in processing an invoice, but clerks at other client companies in the community have an 85% success rate. The client company 22, 30 may then adjust their processes or their software based upon the comparison feedback provided by the host entity 12.

A host entity 12 hosts an enterprise system 10 for a plurality of client companies 22, 30. The enterprise system is shown as a single server, but it is intended that the enterprise system 14 may include one or more servers, databases, and/or cloud environments used to host the system on behalf of the client company 22, 30.

The host entity 12 may have a dashboard server 18 communicatively coupled to the enterprise system for harvesting data and presenting the data to a communication server for display to a client company 22, 30. Although one server is shown for the dashboard server 18, it is intended that the functionality may be performed by one or more servers and databases. The dashboard server 18 may include a plurality of monitoring tools or applications to assist in managing a client company's information. The dashboard server 18 may also be communicatively coupled to a database 20. The database 20 can store records having metadata gathered by the dashboard server 18.

The database 20 stores metadata, which is information about a client company's transactions and/or software operations, but does not include data about the underlying transaction and/or software operation. For example, a client company in the healthcare industry, such as a hospital, may order a suture tray with all of the tools and items needed to provide stitches to a patient. The database 20 may store information about how many suture trays are ordered for the sake of comparing the ordering trends with other hospitals. But the database 20 may not store information about a particular patient that needed stitches or the reason the stitches were applied. In the exemplary embodiment, the database 20 may not store any sensitive information or information which is not allowed to be shared or stored.

The host entity 12 also has a communication server 16 (e.g., a web server) to transmit data to and from the client companies. The host entity's communication server 16 may present a webpage to a communication server 26, 34 (e.g., web server) of the client company 22, 30. The host entity's communication server 16 may populate the webpage with data obtained from a communicatively coupled dashboard server 18, and the host entity's communication server 16 may transmit the webpage for display at the client company 22, 30.

Although two client companies 22, 30 are shown, it is intended that the host entity 12 may host a community of any number of client companies 22, 30. Also, although the exemplary embodiment recites the use of an enterprise system 14, it is intended that any platform or software that is consistent with the scope of this disclosure may be used. In this exemplary embodiment, each client company 22, 30 may have an enterprise resource planning (ERP) server 28, 36. Although one ERP server 28, 36 is shown for each client company 22, 30, it is intended that the functionality may be performed by one or more servers and databases. The ERP server 28, 36 may be communicatively coupled to the communication server 26, 34 of the client company 22, 30 to transmit data to and from the communication server 26, 34 of the host entity 12, which is coupled to the host entity's enterprise system 14. These servers may communicate over a network, such as the internet.

The client company 22, 30 has a workstation 24, 32 and/or other computing device (e.g., desktop computer, laptop computer, tablet computer, mobile device, cellular phone, smartphone, personal data assistant) that can communicate through the client company's communication server 26, 34 with the host entity 12. The host entity 12 can generate a webpage using the dashboard server 18 and data from the database 20 to provide the community information to the workstation 24, 32 at the client entity. This information is generated by the host entity 12 and configured for display on a graphical user interface (e.g., web browser) of the workstation 24, 32 of the client company 22, 30, as described below with respect to FIGS. 3 to 9.

In an alternative embodiment, the host entity 12 can obtain information from a client company 22, 30 to provide insight. The system can be configured so that the ERP server 28, 36 can extract information and provide it to the dashboard server 18 so that the host entity 12 can provide information about trends, efficiencies, and performance.

By gathering transactional metadata from a community of enterprise system 14 client companies 22, 30, the system can provide comparative analysis of system and user efficiency. Furthermore, by gathering metadata about the community's systems themselves (e.g., versions, patches), it is possible to provide additional comparative analysis for system and user performance across different versions. Further, by adding additional metadata about system changes and system events (i.e., monitors), additional comparative analysis can be provided.

Examples of how a host entity 12 can use metadata to compare the client company 22, 30 with others in the community include, but are not limited to, an ability to: (1) analyze on-line transactional usage for patterns/comparisons by system/transaction/function; (2) analyze batch system usage for patterns/comparisons by system/transaction/function; (3) analyze system performance metrics for patterns/comparisons by system/transaction/function; (4) analyze system level (version/upgrade/cyclical/patch) for patterns/comparisons by system/transaction/function; (5) analyze adhoc query usage/efficiency (and impact on overall system performance); (6) analyze user logins for patterns/comparisons by system/transaction/function; (7) analyze user session duration/habits for patterns/comparisons by system/transaction/function; (8) analyze user efficiencies for patterns/comparisons by system/transaction/function; (9) identify anomalous user behavior (i.e., users logging in from home @ 2:30 am); and (10) identify anomalous transaction and/or software operation behavior (i.e., daemon process that updates Accounts Payable Vendor terms before scheduled check runs and changes back after check run).

In one embodiment, an internal control system can harvest metadata about the actual system itself, including all source code, objects, screens, configurations, database, etc. This system would allow for: (1) change control analysis; (2) configuration comparisons with community; (3) all performance metrics above sliced by any changes to system; and (4) system delta(s) from delivered "gold code."

Figure 2:
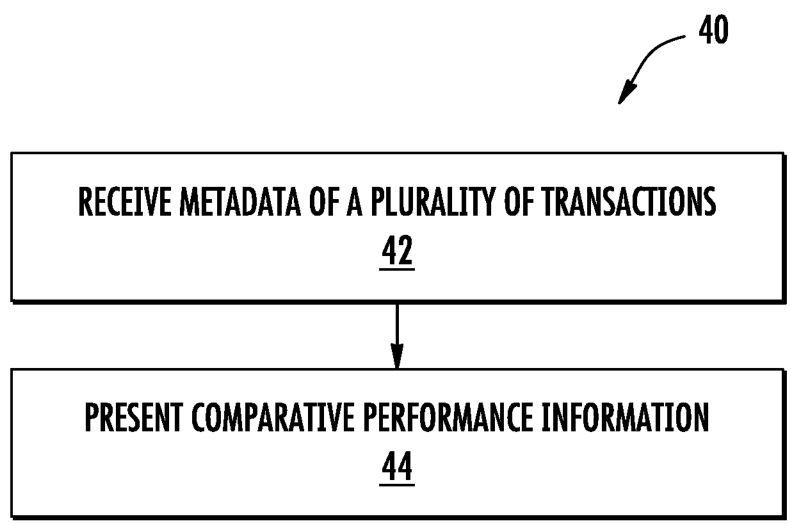
FIG. 2 shows a method according to an exemplary embodiment.

Referring to FIG. 2, a method diagram 40 for managing and disseminating community information in a cloud is shown according to an exemplary embodiment.

In step 42, a server may receive over a communication network from a computer of each of a plurality of client companies, transmittance of metadata of a plurality of transactions and/or software operations in enterprise resource planning systems being operated by the plurality of client companies. Each of the software operations may be linked to a specific metadata permitting the server to group data relating to each software operation to a specific category. In some implementations, the metadata does not include personal identifying information. In some implementations, receiving metadata comprises receiving a transmission of metadata generated by an enterprise resource planning system server of each client company. Non-limiting examples of the types of metadata in the plurality of transactions and/or software operations are further described in FIGS. 3-9 below.

In step 44, the server may present over the communication network to a computer of a selected client company of the plurality of client companies, transmittance of comparative performance information regarding a plurality of the software operations and/or transactions for display of performance of the plurality of the software operations based on metadata of transactions and/or software operations in enterprise resource planning systems of other client companies that are substantially similar to the enterprise resource planning system of the selected client company.

The enterprise resource planning system may implement a business management software that a company may use to collect, store, manage and interpret data from many business activities. Some of these activities may include: product planning, cost and development, manufacturing or service delivery, marketing and sales, inventory management, shipping and/or payment. The system may provide an integrated view of core business processes, often in real-time, using common databases maintained by the database management system. The enterprise resource planning system may track business resources such as cash, raw materials, production capacity. In some implementations, the system may track the status of business commitments including one or more of: orders, purchase orders, and/or payroll. The applications which make up the system may share data across the various departments (manufacturing, purchasing, sales, accounting, etc.) that provide the data. The system may facilitate information flow between all business functions, and manages connections to outside stakeholders.

In some implementations, the performance information may comprise a success rate. The success rate may be determined based on any business and/or software implementation in the one or more companies. In other implementations, the performance information may comprise a processing time. Processing time may be determined based on any business and/or software implementation in one or more companies.

In some implementations, presenting comparative performance information further comprises comparing metadata of transactions and/or software operations of different versions of the same enterprise resource planning system. In some implementations, presenting comparative performance information is performed substantially in real-time. Real-time may be the actual time during which the process and/or event is occurring. Non-limiting examples of types of presenting comparative performance information are further described in FIGS. 3-9 below.

Figure 3:
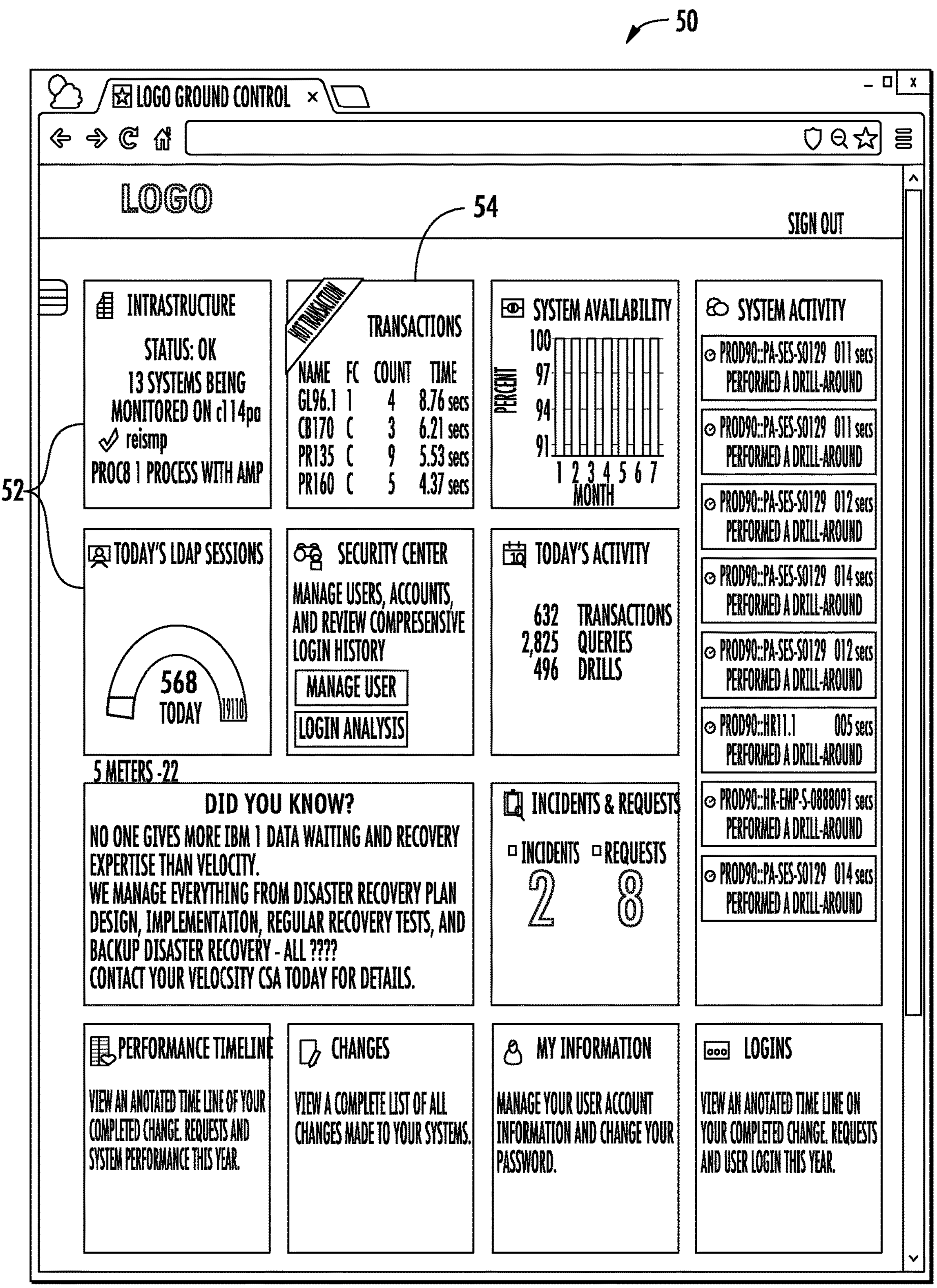
FIG. 3 shows a graphical user interface showing a dashboard according to an exemplary embodiment.

Referring to FIG. 3, a graphical user interface 50 showing a dashboard according to an exemplary embodiment. Each of the panels 52 can be rearranged to a different position on the graphical user interface, and the panels 52 can be added or removed as desired. By activating a button in the upper left corner, the user can expose additional options or panels. Each panel can present information about an aspect of the enterprise system to the client company. For example, one panel is entitled "Transactions" and includes community information. The Transactions panel 54 shows the slowest running transactions and/or software operations in the last three days, which may be the transactions and/or software operations that require the most attention. Some enterprise systems may be running thousands of applications at a time, so it is useful to see which types of transactions and/or software operations take the most amount of time to complete.

Referring to FIG. 4, a graphical user interface 60 showing a heat map of usage is shown for the enterprise system. This heat map may be generated by clicking on a link for "Transaction Analysis" in a panel on a dashboard. The heat map shows usage by transaction and/or software operation count and response time. The left axis 62 represents a time of day, the top axis 64 represents a time of month, the right axis represents total hours, and the bottom axis represents total days. The number on the heat map represents a number of transactions and/or software operations. In this exemplary embodiment, the filter is HR but not HR11.1, referring to an Infor Lawson® human resources application. Although the exemplary embodiments may recite the use of an Oracle or Infor Lawson enterprise system, it is intended that any enterprise system may be used with the methods and systems described herein. As shown in this exemplary heat map, the 16th, 17th, and 30th days of the month are the most busy, and those days happen to coincide with payroll time. It may be useful for the client company to see how other similar businesses are performing during these periods, e.g., whether the number of transactions and/or software operations has been spread out or moved to a different part of the month.

Referring to FIG. 5, a graphical user interface 70 for comparing community information is shown according to an exemplary embodiment. This graphical user interface may be presented to the user upon selecting the "Transactions" panel, as shown in FIG. 3. As shown in the first row 72, the name AP230 refers to a particular application. Each row listed under "Community Size" includes a version number and patch level, along with a corresponding volume. In some instances, different departments within a client company may use different versions or patch levels of the same application. In this example, the client company can observe that it is running the application 24.29 times slower than others using the same version. In another example, for GL291, there are five different versions running in the community, and version 174 is faster than version 153. This client company is running the application with an average response time of 4.03 seconds, which is slower than the slowest version of the application. So the client company may have inefficiencies in this version and may consider upgrading to a different version. This community comparison can provide data that allows the client company to evaluate their efficiencies and delays.

Figure 6:
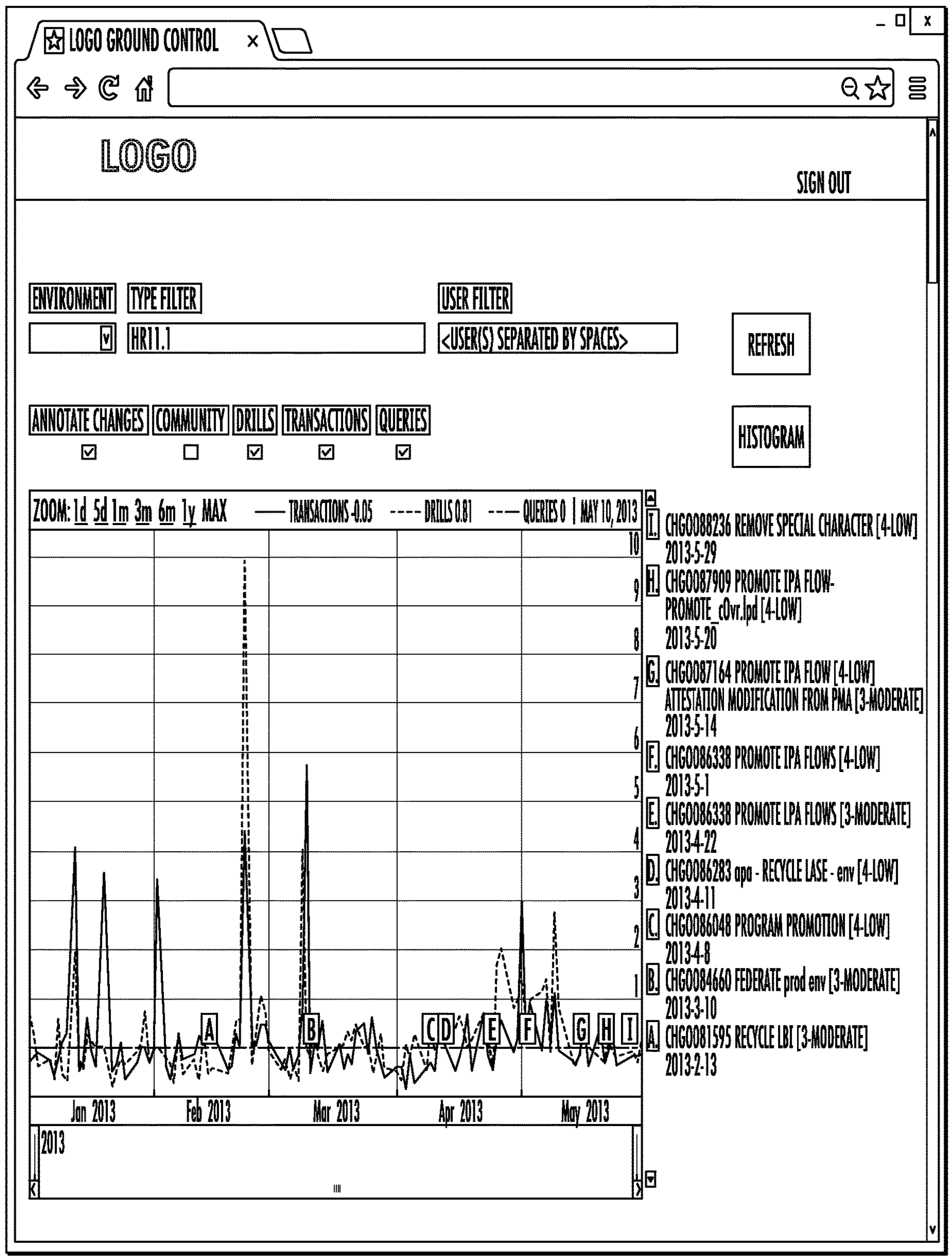
FIG. 6 shows a graphical user interface for displaying performance over time according to an exemplary embodiment.

Referring to FIG. 6, a graphical user interface 80 for displaying performance over time is shown according to an exemplary embodiment. The chart shows response time of transactions and/or software operations, drills, and queries over time. If a modification or change was made to the system, this chart can show how the modification or change affected performance. A filter (e.g., limiting to a certain application) can be used to see which jobs were running. "Drills" can represent a feature of an application where a user drills down into the data to see more information about the a transaction and/or software operation. "Queries" can represent a number of queries by users, some of whom may write improper queries that overwhelm the system. In this example, point "A" represents a time when the client company requested to recycle Lawson Business Intelligence (LBI). Point A is shown on the chart to see how performance was affected.

Figure 7:
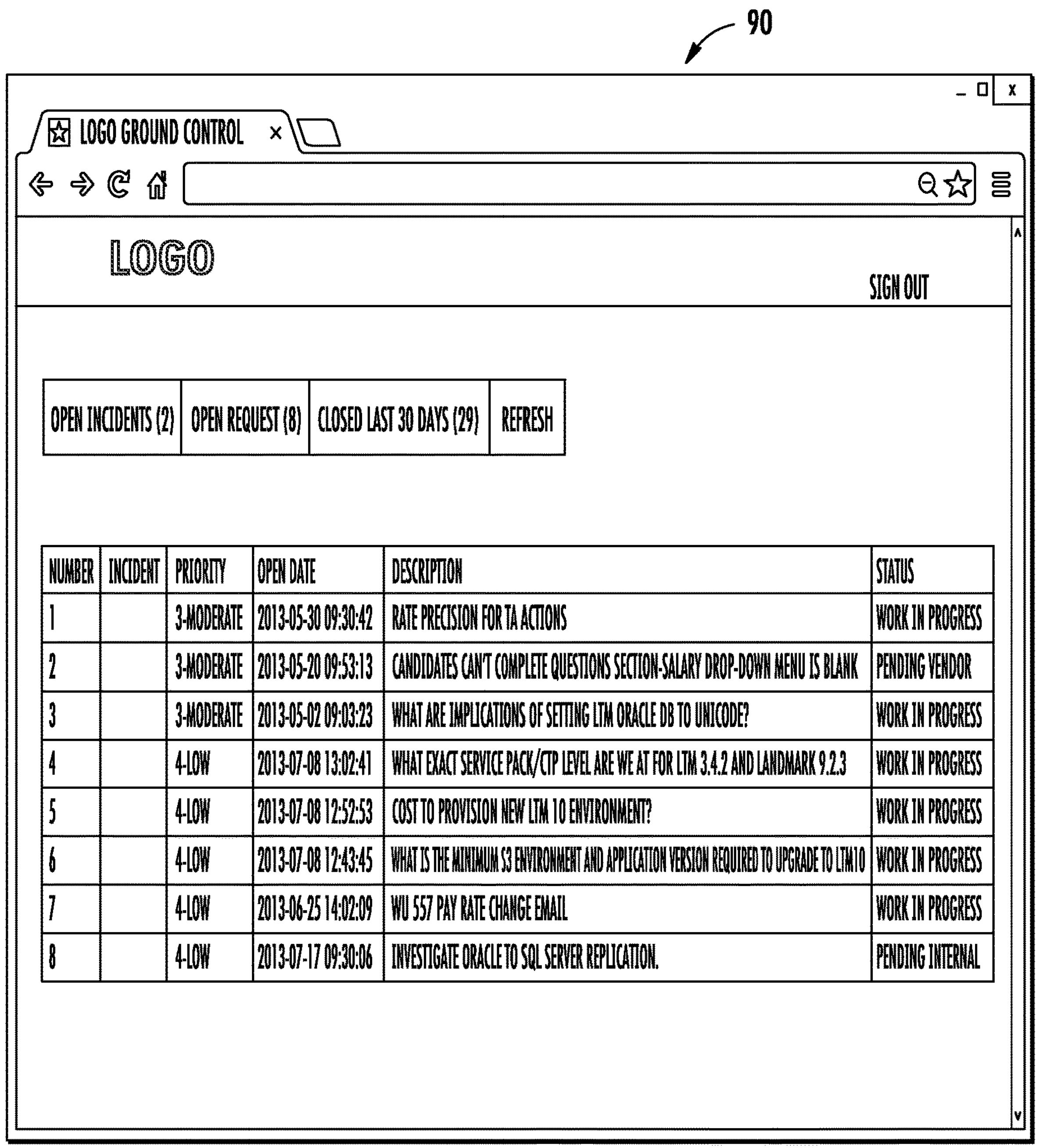
FIG. 7 shows a graphical user interface displaying open requests according to an exemplary embodiment.

Referring to FIG. 7, a graphical user interface 90 displaying open requests is shown according to an exemplary embodiment. By selecting a panel for "Incidents & Requests," as shown in FIG. 3, a user can view a list of open incidents, open requests, and incidents and requests closed within the last 30 days.

Referring to FIG. 8, a graphical user interface 100 for displaying outages is shown according to an exemplary embodiment. In this exemplary embodiment, the number of outages is shown since the installment of the system along with the duration of the outage. In some embodiments, there may also be a description as to the cause of an outage.

Figure 9:
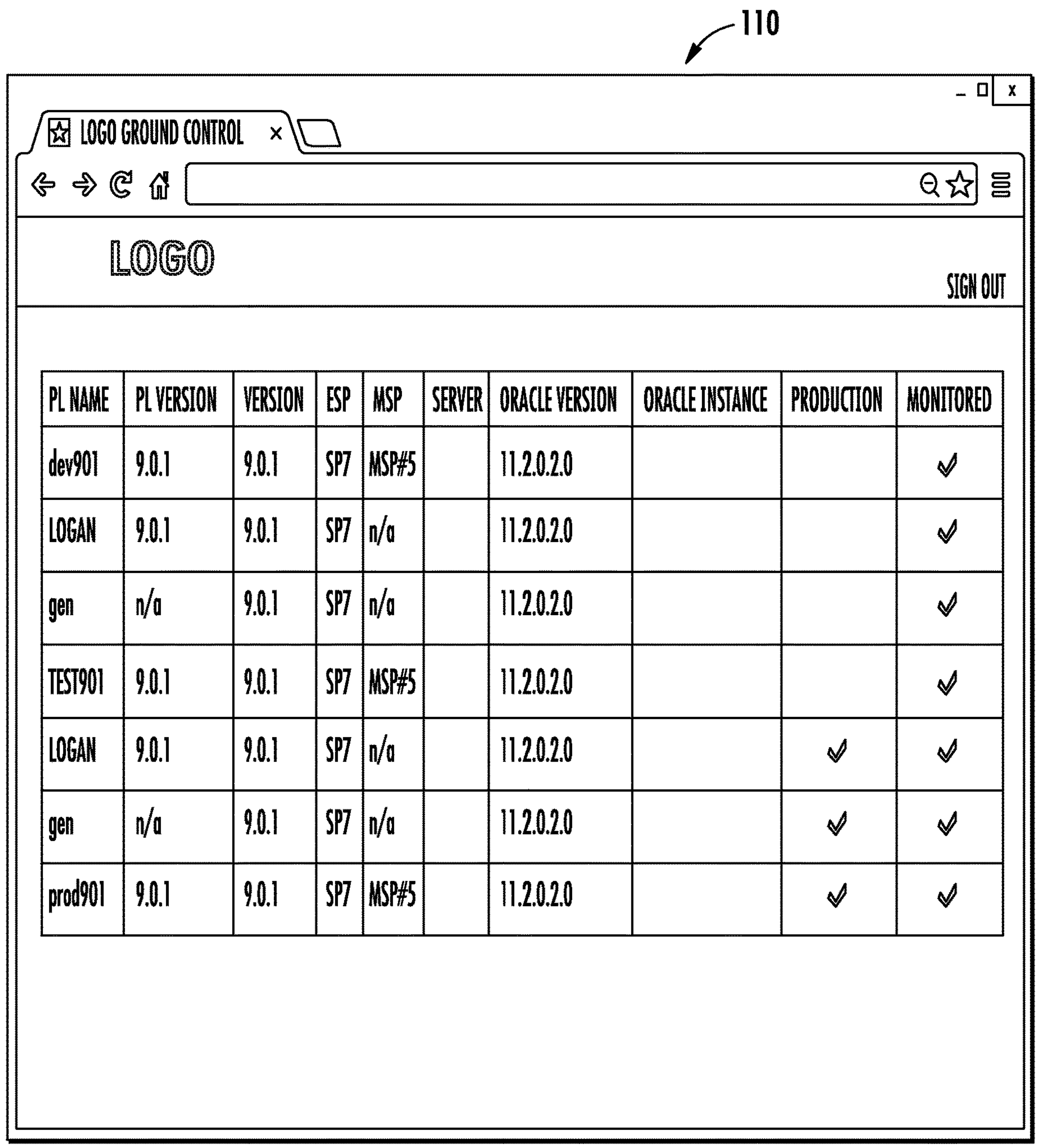
FIG. 9 shows a graphical user interface displaying one or more product lines for a client company according to an exemplary embodiment.

Referring to FIG. 9, a graphical user interface 110 displaying one or more product lines for a client company is shown according to an exemplary embodiment. The graphical user interface may display information regarding development, testing, production, or training. This graphical user interface can give information to client company about the status of the system being hosted by the host entity.

An exemplary method for utilizing the community information is as follows. A client company performs transactions and/or software operations (e.g., actions) in an enterprise system hosted by a host entity, such as in a cloud environment. The host entity stores metadata (e.g., response time, delay time, processing time, usage) about the transactions and/or software operations in a database for the client company's actions and the actions of other client companies. The host entity uses the stored metadata to present information to the client company regarding the performance of the client company in comparison to one or more other client companies having metadata stored in the database. The host entity may present a webpage to the client company that shows the client company's performance based on the particular metadata along with metadata for one or more other client company's using the same or similar applications or performing the same or similar transactions and/or software operations.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "measuring" or "selecting" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A server-implemented method comprising:

receiving, by a server, over a communication network a first set of metadata from a computer of a first client company corresponding to transactions using a software application of different versions of a first enterprise resource planning system operated by the first client company, wherein the first set of metadata does not contain underlying transaction data;

receiving, by the server, over the communication network a second set of metadata from a computer of a second client company corresponding to the software application of different versions of a second enterprise resource planning system operated by the second client company, wherein the second set of metadata does not contain underlying transaction data;

comparing, by the server, the first set of metadata corresponding to each version of the first enterprise resource planning system operated by the first client company with respect to each other to determine performance data associated with one or more features corresponding to each version of the first enterprise resource planning system operated by the first client company, wherein the one or more features are selected from a group consisting of a response time and a volume;

comparing, by the server, the second set of metadata corresponding to each version of the second enterprise resource planning system operated by the second client company with respect to each other to determine performance data associated with the one or more features corresponding to each version of the second enterprise resource planning system operated by the second client company;

comparing, by the server, the first set of metadata to the second set of metadata to determine performance data associated to the one or more features corresponding to each version of the software application in the first enterprise resource planning system operated by the first client company and the second enterprise resource planning system operated by the second client company; and wherein the server performs a comparison between the first set of metadata and the second set of metadata taking into consideration data corresponding to configuration of the computer of the first client company and the second client company; and presenting, by the server, on a graphical user interface of the computer of each of the first client company and the second client company, the performance data corresponding to performance of transactions using different versions of the software application in the first enterprise resource planning system operated by the first client company and the second enterprise resource planning system operated by the second client company, performance of each version of the first enterprise resource planning system operated by the first client company, and performance of each version of the second enterprise resource planning system operated by the second client company, wherein the graphical user interface of the computer of each of the first client company and the second client company comprises a panel for each version of the software application, and within each panel, the graphical user interface comprises a listing of the performance data of the transactions with respect to each other and other computers of other companies running the same software application, and wherein the computer of the first client company is configured to execute a new version of the software application based on an evaluation of the performance data of the transactions associated with the different versions of the software application in the first enterprise resource planning system with respect to the computers of other companies running the same software application.

2. The server-implemented method according to claim 1, wherein the first set of metadata and the second set of metadata comprises data selected from a group consisting of response time, delay time, processing time, and usage.

3. The server-implemented method according to claim 1, wherein the first enterprise resource planning system and the second enterprise resource planning system have a same version.

4. The server-implemented method according to claim 1, wherein the first enterprise resource planning system and the second enterprise resource planning system have a different version.

5. The server-implemented method according to claim 1, wherein the server performs a real-time comparison of the first set of metadata and the second set of metadata to determine performance data associated to the one or more features corresponding to each version of the software application in the first and the second enterprise resource planning system of the first client company and second client company.

6. The server-implemented method according to claim 1, wherein the one or more features corresponding to each version of the software application in the first and the second enterprise resource planning system of the first client company and second client company further comprises a success rate and a processing time.

7. A system comprising:

a communication network;

a dashboard server; and a processor configured to:

receive over the communication network from a computer of each of a plurality of client companies metadata of a plurality of software applications of different versions of an enterprise resource planning system being operated by each of the plurality of client companies, wherein the metadata does not contain underlying transaction data from the plurality of software applications;

compare the metadata corresponding to each version of the enterprise resource planning system operated by each of the plurality of client companies with respect to each other to determine performance data associated with one or more features corresponding to each version of the enterprise resource planning system operated by each of the plurality of client companies, wherein the one or more features are selected from a group consisting of a response time and a volume;

compare the metadata received from the computer of each of the plurality of client companies to determine performance data associated to the one or more features corresponding to each version of the software application in the enterprise resource planning system of each of the plurality of client companies, and wherein the processor performs a comparison between the metadata received from the computer of each of the plurality of client companies taking into consideration data corresponding to configuration of the computer of each of the plurality of client companies; and transmit on a graphical user interface of the computer of each of the first client company and the second client company the performance data corresponding to performance of transactions of the software application in each version of the enterprise resource planning system of each of the plurality of client companies and the performance data corresponding to performance of transactions of different versions of the software application in the enterprise resource planning system of each of the plurality of client companies, the performance data representing the running speed corresponding to each version of the software application in the enterprise resource planning system of each of the plurality of client companies, the performance data further representing the volume corresponding to each version of the software application in the enterprise resource planning system of each of the plurality of client companies, wherein the graphical user interface of the computer of each of the plurality of client companies comprises a panel for each version of the software application, and within each panel, the graphical user interface comprises a listing of the performance data of the transactions with respect to the computers of each of the plurality of client companies running the same software application, wherein the computer of the first client company is configured to execute a new version of the software application based on an evaluation of the performance data of the transactions associated with the different versions of the software application in the first enterprise resource planning system with respect to the computers of other companies running the same software application.

8. The system according to claim 7, further comprising an enterprise resource planning server coupled to the dashboard server, wherein the enterprise resource planning server is hosted on behalf of at least one client company of the plurality of client companies.

9. The system according to claim 8, wherein the enterprise resource planning server is configured to generate the metadata and transmit the metadata to the dashboard server.

10. The system according to claim 7, further comprising a database coupled to the dashboard server, wherein the database is configured to store the metadata of the plurality of software applications performed by the enterprise resource planning system of each of the plurality of client companies.

11. The system according to claim 7, wherein the metadata further comprises data selected from a group consisting of response time, delay time, processing time, and usage.

12. The system according to claim 7, wherein the dashboard server performs a real-time comparison of the metadata received from the computer of each of the plurality of client companies to determine performance data associated to the one or more features corresponding to each version of the software application in the enterprise resource planning system of each of the plurality of client companies.

13. The system according to claim 7, wherein the one or more features corresponding to each version of the software application in the enterprise resource planning system of each of the plurality of client companies further comprises a success rate and a processing time.

* * * * *